United States Patent [19]

Broussard et al.

[11] Patent Number: 5,004,798

[45] Date of Patent: * Apr. 2, 1991

[54] NOVEL POLYACETAL COPOLYMERS OF TRIOXANE AND TRIMETHYLOLPROPANE FORMAL DERIVATIVES

[75] Inventors: Jerry A. Broussard, Summit; Andrew B. Auerbach, Livingston, both of N.J.; Nan L. Yang, Staten Island, N.Y.; James L. Paul, Summit, N.J.; Yong C. Zheng, New York; Chong L. Zhang, Staten Island, both of N.Y.

[73] Assignee: Hoechst Celanese Corporation, Somerville, N.J.

[*] Notice: The portion of the term of this patent subsequent to Dec. 4, 2007 has been disclaimed.

[21] Appl. No.: 350,799

[22] Filed: May 12, 1989

[51] Int. Cl.$^5$ .................................. C08G 4/00
[52] U.S. Cl. ...................... 528/230; 528/241; 528/245; 528/247; 528/250
[58] Field of Search ............... 528/230, 241, 245, 247, 528/250

[56] References Cited

U.S. PATENT DOCUMENTS

| | | | |
|---|---|---|---|
| 4,076,727 | 2/1978 | Zey et al. ............................ | 549/372 |
| 4,758,608 | 7/1988 | Collins et al. ........................ | 522/43 |
| 4,792,579 | 12/1988 | Satoh et al. ......................... | 524/145 |
| 4,876,368 | 10/1989 | Broussard ........................... | 549/374 |

OTHER PUBLICATIONS

CA 69:107263q, "Poly(Oxymethylene)".
CA 69:67927a, "Formaldehyde Glyoxal Bis(Trimethylolpropane Acetal) Polymers".
CA 101:193339c, "Polyoxymethylene Molding Compositions".

Primary Examiner—John Kight, III
Assistant Examiner—C. A. Acquah
Attorney, Agent, or Firm—Nixon & Vanderhye

[57] ABSTRACT

Cationic copolymerization of trioxane and trimethylolpropane (TMP) formal or its ester derivatives yields acetal copolymers having pendant functional groups. The TMP formal or ester derivatives of TMP formal may therefore include functional groups selected from hydroxyl or ester moieties which are protected and thus survive the copolymerization with trioxane. These groups may then be present as functional reactive sites for the subsequent synthesis of block copolymers and/or to chemically bind modifiers to the acetal copolymer backbone, for example.

17 Claims, 1 Drawing Sheet

NOVEL POLYACETAL COPOLYMERS OF TRIOXANE AND TRIMETHYLOLPROPANE FORMAL DERIVATIVES

FIELD OF THE INVENTION

This invention relates to acetal polymers which are structurally related to polyoxymethylene (i.e., polymers having recurring —$CH_2O$— units). More specifically, the invention relates to a novel class of acetal copolymers formed by the copolymerization of the comonomers trioxane and funtionalized derivatives of trimethyolpropane formal.

BACKGROUND AND SUMMARY OF THE INVENTION

Acetal polymers represent an important class of engineering resins due to numerous favorable physical properties. For this reason, acetal polymers have a wide range of commercial applications, for example, as parts for automobiles, as plumbing components and a variety of household and personal products.

It is oftentimes desireable to modify one or more of the inherently advantageous physical properties of acetal polymers so as to meet the needs of specific end-use applications. Normally, to achieve such modified properties, acetal polymers have been blended with a variety of other resins and/or ingredients (e.g., impact modifying agents, flame retardants, light and heat stabilizers, fillers, and the like). Usually the blending of acetal polymers is not without its own problems due principally to the highly crystalline nature of acetal polymers which is evident in a low level of compatibility with other polymers.

Grafting of a different resin and/or a specific chemical moiety onto a polyacetal backbone would present an attractive alternative to blending so as to achieve a block copolymer having the desired modified physical and/or chemical properties. However, with acetal polymers, grafting is usually not possible due to the low level of polyacetal end group functionality—that is, since each acetal copolymer molecule carries a maximum of two functional groups, e.g., hydroxyl end groups.

According to the present invention, however, a novel class of polyacetal copolymers is provided which retain the beneficial physical and chemical properties of conventional acetal polymers, while yet also providing greatly increased functionality. Therefore, the acetal copolymers of this invention may be reacted with other resins and/or chemical moieties so as to, for example, permit a variety of acetal polymers to be synthesized having chemically bound (i.e., not merely blended) modifying agents.

Broadly, the copolymers of the present invention are obtained by the cationic copolymerization of trioxane with trimethylolpropane formal or an ester derivative of trimethylolpropane formal. The resulting copolymer will therefore exhibit side chain funtionality so as to enable synthesis of, for example, block copolymers comprised of the acetal copolymer of this invention and other specific polymers to achieve desired chemical and/or physical properties.

These, as well as other aspects and advantages of the present invention will become more clear after careful consideration is give to the following detailed description of the preferred exemplary embodiments.

BRIEF DESCRIPTION OF THE ACCOMPANYING DRAWINGS

FIG. 1 is a TGA plot showing the thermal stability of a copolymer of the present invention in comparison to a commercial grade of acetal copolymer and a trioxane homopolymer.

DETAILED DESCRIPTION OF THE PREFERRED EXEMPLARY EMBODIMENTS

Figure 1:
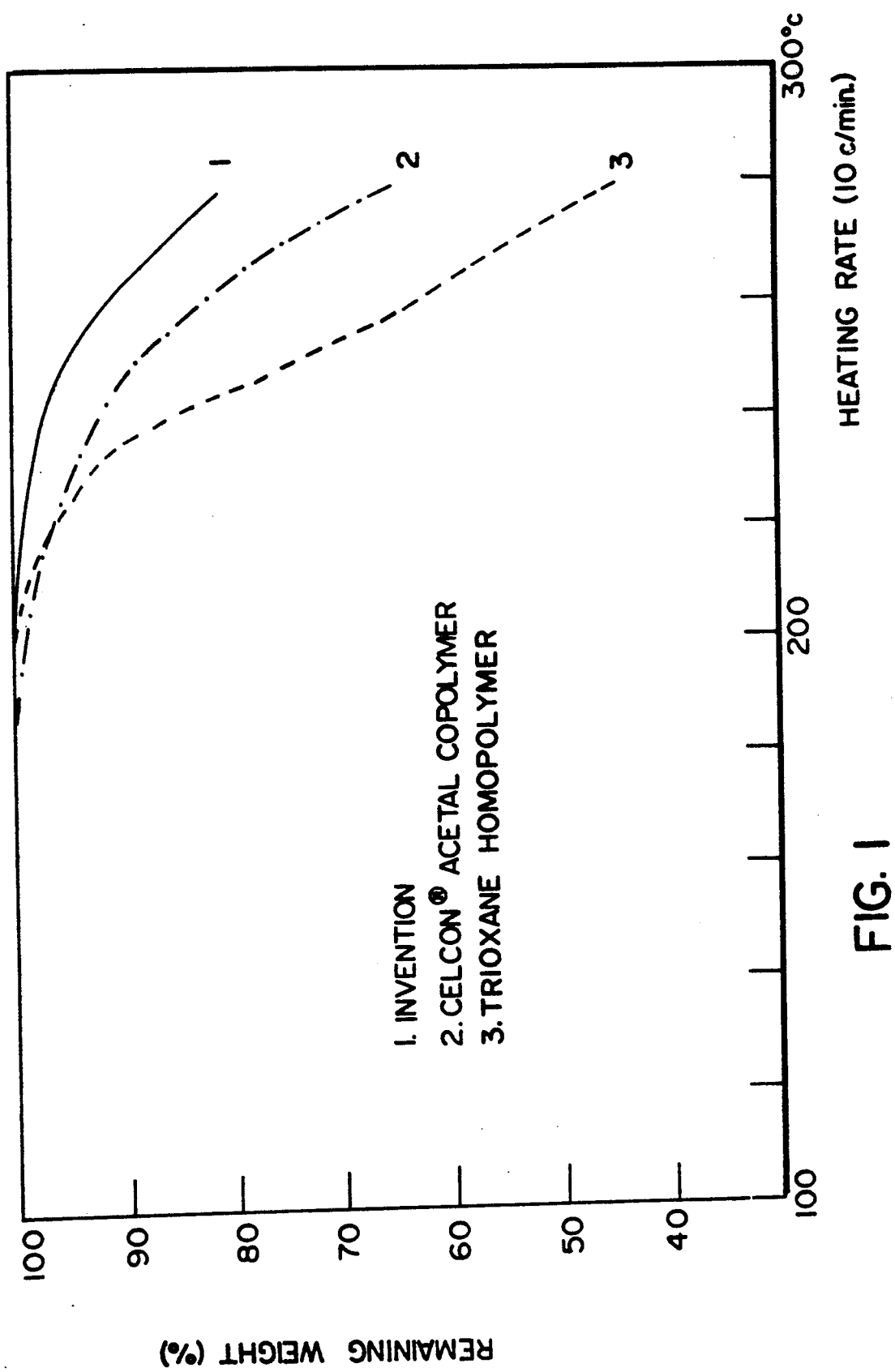

The trimethylolpropane (TMP) formal and its ester derivatives useful as a comonomer in the cationic copolymerization with trioxane according to the present invention are of the general formula:

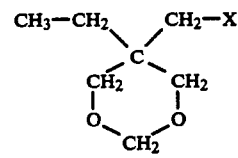

where X is a hydroxyl radical, or an ester radical. Suitable ester radicals include, for example, saturated aliphatic esters, unsaturated aliphatic esters, substituted saturated aliphatic esters, and aromatic esters (e.g., benzoic acid). Thus, for example, X may be represented by the formulas —OH;

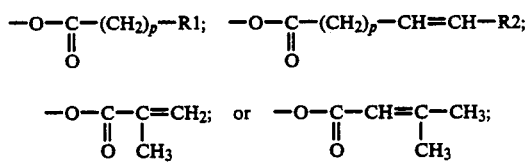

where each p is an integer from zero to 8, R1 is a methyl or phenyl radical, and R2 is hydrogen or a methyl or phenyl radical.

Alternatively, X may be represented by halogen substituted esters of the above formulas, for example, halogen substituted alkenoic acids (e.g., 2-chloro-ethanoic acid or 3-chloro-propanoic acid).

The resulting copolymer will have oxymethylene units (—$CH_2O$) interspersed with units derived from the TMP comonomer. The functionalized moieties will thus be present in the copolymer as pendant groups along the copolymer's backbone as represented by the structural Formula I, exclusive of chain terminating groups:

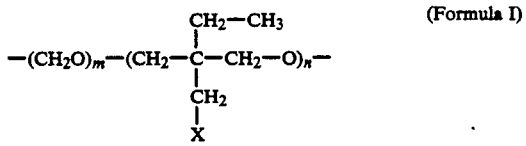

(Formula I)

where the pendant functional group X is as defined above, and m and n are each integers such that m+n is between 5 to 20000, and the mole ratio of units of subscript n to the units of subscript m is between about 1:5000 to 1:1, and preferably less than about 1:20.

The copolymers of Formula I are essentially linear, but may also be cross-linked (particularly when X is represented by a hydroxyl group) via the side chain acting as a cross-linking agent. These cross-linked copolymers are usually insoluble in most organic solvents, and will typically exhibit low molecular weights.

The ester group of the trimethylolpropane formal derivatives employed as comonomers according to this invention are much less reactive (essentially nonreactive) during polymerization as compared to the formal group itself or the trioxane. As a result, the copolymers according to this invention are essentially linear with side chain functionality of $CH_2X$, when X in the trimethylolpropane formal derivative is an ester group. The pendant funtional group X may then be employed to react with other moieties to form, for example, a graft copolymer having a backbone of the Formula I but with side chain groups of a desired chemical moiety replacing the functionalized group X.

Alternatively, the ester functional group can by hydrolyzed after polymerization to yield a pendant hydroxyl functional group for use in subsequent grafting onto the polyacetal backbone. Hydrolysis, in addition to converting pendant ester groups to hydroxyl groups also effects removal of unstable hemiacetal end groups and improves stability of the resulting polyacetal copolymers of this invention.

The molecular weights of the acetal copolymers according to this invention are greater than about 1500, for example, up to about 500,000 (preferably up to about 250,000). The higher molecular weight copolymers are particularly preferred since lower molecular weight copolymers could then be obtained by including well known chain transfer agents (e.g., dimethoxymethane) to reduce the molecular weights to those that may be desired for any given end use application.

The acetal copolymers of this invention will exhibit thermal stability in excess of about 200° C. as determined by thermogravimetric analysis (TGA) at a heating rate of 10° C./min. under an inert atmosphere, and will have a high degree of crystallinity (e.g., greater than about 40%). For example, with comonomer incorporation of trimethylolpropane or its ester derivatives in the polymer chain of between about 3 to 4 mole percent, crystallinity of about 69% has been observed.

Accompanying FIG. 1 shows a TGA plot of an acetal copolymer according to this invention (i.e., obtained by the cationic solution copolymerization of trioxane with EHMDO) in comparison to a commercial grade of acetal copolymer (Celcon ® polyoxymethylene/polyoxyethylene copolymer) and trioxane homopolymer. As is seen, the copolymers of this invention exhibit thermal stability characteristics comparable (if not exceeding) those of the commercial acetal copolymer and the trioxane homopolymer.

The preferred catalysts used in the preparation of the copolymers of the present invention are boron trifluoride and its coordination complexes with organic compounds in which oxygen or sulfur is the donor atom. The coordination complexes of boron trifluoride may, for example, be a complex with a phenol, an ether, an ester, or a dialkyl sulfide. Boron trifluoride etherate ($BF_3 \cdot Et_2O$) is the preferred coordination complex used in the cationic copolymerization processes of the present invention. Alternately, gaseous $BF_3$ may be employed as the polymerization initiator. In general, the initiator should be present in the polymerization zone in amounts such that its boron trifluoride content is between about 1 to 10000 ppm, preferably 10 to 1000 ppm, and more preferably 50 to 200 ppm.

The monomers in the reaction zone are preferably anhydrous or substantially anyhdrous. Small amounts of moisture, such as may be present in commercial grade reactants or may be introduced by contact with atmospheric air will not prevent polymerization, but should be essentially removed for best yields and to maximize molecular weights of the resulting copolymers.

Monomers other than trioxane and trimethylolpropane formal or its functionalized derivatives may also be employed in the practice of this invention so as to from terpolymers or tetrapolymers—that is, a polymer having units in the chain derived from trioxane, trimethylolpropane or its functionalized derivatives, and the other monomer(s) which may be employed. In general, these additional monomers that may be employed are cyclic ethers with ethylene oxide, 1,3-dioxolane, 1,3-dioxepane, 1,3-dioxep-5-ene, and 1,3,5-trioxepane being particularly preferred.

As used herein and in the accompanying claims, the term "copolymer" is intended to encompass any polymer having, as at least part of the polymer chain, structural units derived from trioxane and trimethylolpropane formal or its functionalized derivatives. Thus, the term "copolymer" as used herein and in the accompanying claims is intended to encompass terpolymers, tetrapolymers, and the like which include structural units in the polymer chain derived from trioxane and trimethylolpropane formal or its functionalized derivatives, in addition to other units derived from, e.g., the cyclic ether monomers described above, if present during polymerization.

The acetal copolymers of this invention may be formed by either bulk or solution polymerization processes. In the solution polymerization process, for example, the trioxane, trimethylolpropane formal derivative, and catalyst are dissolved in a common anhydrous solvent, such as cyclohexane, and permitted to react in a sealed reaction zone. The temperature in the reaction zone may vary from about 0° C. to about 100° C. When employing bulk copolymerization techniques, the temperature in the reaction zone may be greater than about 65° C. but less than 100° to 110° C. The period of reaction may vary from about a few minutes to about 72 hours or more. Pressures from sub-atmospheric to about 100 atmospheres, or more may be used, although pressures between about 1 to 10 atmospheres are presently preferred.

The ratio of trioxane to trimethylolpropane formal comonomer in the reaction mixture may roughly be predetermined for a desired mole ratio of units derived from trimethylolpropane formal in the polymer. The particular incorporation levels of the trimethylolpropane formal derived units in the resulting copolymers will depend upon a number of factors, for example, the reaction time, temperature, amount of catalyst employed, the amount of trimethylolpropane formal or its ester derivatives present in the reaction zone and the like. It has been observed that the amount of trimethylolpropane formal units in the resulting copolymer increases with an increase in trimethylolpropane formal comonomer presence in the reaction zone. As an example only, the incorporation of between about 0.5 to about 1.0 mole percent of trimethylolpropane formal derived units in the resulting copolymers has been observed to be on the order of one-half the amount of trimethylolpropane formal in the reaction zone.

During polymerization, some of the trioxane will react to form a homopolymer. In addition, unstable end groups formed in the copolymerization and unreacted monomer may be present after the reaction has proceeded for a sufficient time period. The trioxane homopolymer, the unstable end groups and/or any unreacted monomer may be removed by base hydrolysis so as to generate stable structures of the acetal copolymers of this invention. Generally, this base hydrolysis involves dissolving the crude copolymer in a suitable solvent and containing a suitable base, and maintaining the solution at elevated temperatures sufficient to remove hemiacetal end groups and/or saponify ester groups. The hydrolysis, however, should be such that saponification of the acrylate groups in the side chains is minimized (i.e., when the trimethylolpropane formal comonomer is an acrylate derivative). The polymer may then be cooled to precipitate out the solid material.

The present invention is further illustrated by way of the following non-limiting examples.

EXAMPLES

The copolymers formed according to the following Examples were characterized both qualitatively and quantitatively by NMR spectroscopy using an IBM WP-200 SY FT NMR spectometer operating at 200 MHz for protons at a temperature of 120° C., and DMSO-d6 as solvent with tetramethylsilane as an internal standard.

Example I

A. Synthesis of 5-ethyl-5-hydroxymethyl-1,3-dioxane (EHMDO) - Monomer MI

In a one-liter three neck flask were placed 405 grams of 2-ethyl-2-hydroxymethyl-1,3-propanediol, 90 grams of paraformaldehyde, 0.9 grams of p-toluene sulfonic acid monohydrate and 150 ml of toluene. The flask was equipped with a Dean-stark trap and a condensor. The reaction mixture was stirred at a bath temperature of 120° C. to 170° C. for three hours. The toluene-water was collected, and after removing the toluene, the crude product was distilled under vacuum at 10–11 mm Hg and 115° C. to 117° C. 410 grams of 5-ethyl-5-hydroxymethyl-1,3-dioxane (EHMDO) were collected. The product was then dried by molecular sieve and had a water content of about 350 ppm. NMR spectra confirmed that EHMDO was obtained.

B. Synthesis of EHMDO Ester of Acetic Acid—Monomer MII

EHMDO (73 g., 0.5 mol.) acetic anhydride (60 ml., 0.6 mol.) and p-toluene sulfonic acid monohydrate (1.5 g.) were placed in a 250 ml flask fitted with a condenser. The reaction mixture was stirred at a bath temperature of 120°–140° C. for four hours. The acetic acid and anhydride were then removed under vacuum. The resulting monomer was distilled and collected under vacuum. NMR spectra confirmed that monomer MII had been obtained.

C. Synthesis of EHMDO Ester of Acrylic Acid—Monomer MIII

Two synthesis routes to obtain EHMDO ester of acrylic acid were employed as follows:
(i) EHMDO (14.6 g., 0.1 mol.) was placed in a 50 ml three necked flask fitted with a dropper funnel and a drying tube. Acryloyl chloride (9.05 g., 0.1 mol.) was added dropwise into the flask over a period of 15 minutes while being cooled in an ice bath. The generated hydrogen chloride was removed with either nitrogen gas or a water aspirator. The reaction mixture was stirred at room temperature for four hours and at 60°–70° C. for one additional hour under a nitrogen atmosphere. The reaction mixture was then extracted with water (4×50 ml). The water layer was separated and the product was dried overnight with —MgSO$_4$—. After filtering out the solid MgSO$_4$, the product was distilled with a Widmer column under vacuum. The distillate, which NMR spectra confirmed to be monomer MIII, was then collected.

(ii) EHMDO (88g., 0.6 mol), acrylic acid (36.4 g., 0.5 mol.), p-toluene sulfonic acid monohydride (0.5 g.), hydroquinone (0.1 g) and toluene (50 ml) were placed in a 250 ml flask fitted with a Dean-Stark trap and a condenser. The reaction mixture was stirred at a bath temperature of 160°–180° C. for three hours. Toluene-water was collected (water layer, 8 ml). After cooling, the resulting solution was extracted with water (4×150 ml) and the water layer was separated. The crude product was dried with MgSO$_4$ overnight. After filtering the MgSO$_4$, the monomer was distilled with a Widmer column under vacuum. NMR spectra confirmed that the product was monomer MIII.

D. Synthesis of EHMDO Ester of 3-Chloro-propanoic Acid—Monomer MIV 5-ethyl-5-hydroxymethyl-1,3-dioxane (14.6 g., 0.1 mol.) was placed in a 50 ml three-necked flask fitted with a dropper funnel and a drying tube. Acryloyl chloride (9.05 g., 0.1 mol.) was added dropwise into the flask over a period of 15 minutes while being cooled in an ice bath. The generated hydrogen chloride was retained in the reaction mixture. The reaction mixture was stirred at room temperature for four hours and at 60°–70° C. for one additional hour under a nitrogen atmosphere. The reaction mixture was then extracted with water (4×50 ml) and the resulting water layer was separated. The reaction product was dried overnight with MgSO$_4$. After filtering out the solid MgSO$_4$, the reaction product was distilled with a Widmer column under vacuum and the distillate (b.p. 148°–152° C./8mm) was collected. NMR spectra confirmed that monomer MIV was obtained.

E. Synthesis of EHMDO Ester of 2-Methylacrylic Acid—Monomer MV 5-ethyl-5-hydroxymethyl-1,3-dioxane (14.6 g., 0.1 mol.), methacrylic anhydride (18.5 g., 0.12 mol.), p-toluene sulfonic acid monohydrate (0.15 g.) and hydroquinone (0.01g.) were placed in a 100 ml flask fitted with a condenser. The reaction mixture was stirred at a bath temperature of 130°–140° C. for four hours, and was then extracted with water (4×100 ml). The resulting water layer was separated and the crude product (19.7 g.) was dried with MgSO$_4$ (2g.) overnight. After filtering MgSO$_4$, the monomer was distilled and collected under vacuum. NMR spectra confirmed that monomer MV had been obtained.

F. Synthesis of EHMDO Ester of 3-Methylacrylic Acid—Monomer MVI

EHMDO (35 g., 0.24 mol.), crotonic acid (17.2 g., 0.2 mol.), p-toluene sulfonic acid monohydrate (0.20 g), hydroquinone (0.02g), and toluene (50 ml) were placed in a 250 ml flask fitted with a Dean-Stark trap and a condenser. The reaction mixture was stirred at a bath temperature of 160°–180° C. for seven hours. The water-toluene was collected (about 1 ml H₂O). The solution was then extracted with water (7×60ml) and the resulting water layer was removed. The crude product was dried with MgSO₄ overnight. The MgSO₄ was filtered out and the product was distilled under vacuum. NMR spectra confirmed that monomer MVI had been obtained.

G. Synthesis of EHMDO Ester of Undedocenoic Acid—Monomer MVII

EHMDO (7.3 g., 0.05 mol.) was placed in a 50 ml three-necked flask fitted with a dropper funnel and a drying tube. 10-undedocyloyl chloride (10.2 g., 0.05 mol.) was added into the flask at room temperature over a period of 5 minutes. The reaction mixture was stirred at room temperature for four hours while under a nitrogen atmosphere. The resulting product was distilled and collected under vacuum. NMR spectra confirmed that monomer MVII had been obtained.

H. Synthesis of EHMDO Ester of Cinnamic Acid—Monomer MVIII

EHMDO (7.3 g., 0.05 mol.) was placed in a 100 ml three-necked flask fitted with a dropper funnel and a drying tube. Cinnamyl chloride (8.3 g., 0.05 mol.) was added into the flask at room temperature over a period of five minutes. The reaction mixture was stirred at room temperature for 24 hours and for an additional two hours at 50°-60° C. The reaction mixture was then extracted twice with benzene-water (1:1, 2×20 ml) and the water layer was separated. After removing the benzene, a viscous crude product (13.3 g., 98%) was obtained. The crude product was distilled under vacuum and the monomer was collected. NMR spectra confirmed that monomer MVIII had been obtained.

I. Synthesis of EHMDO Ester of 3,3-Dimethylacrylic Acid—Monomer MIX

EHMDO (35 g., 0.24 mol.), 3,3-dimethylacrylic acid (20 g., 0.20 mol), p-toluene sulfonic acid monohydrate (0.5g), hydroquinone (0.05g) and xylene (40 ml) were placed in a 250 ml flask fitted with a Dean-Stark trap and a condenser. The reaction mixture was stirred at a bath temperature of 190°-210° C. for ten hours. The xylene-water was extracted with water (5×100ml) and the resulting water layer was separated. The solution was then dried with MgSO₄ overnight and then filtered. After removing xylene and unreacted 3,3-dimethyl acrylic acid (about 5 g.), the monomer product was distilled and collected under vacuum. NMR spectra confirmed that monomer MIX had been obtained.

Example II

(Copolymerization of Trioxane with EHMDO, Monomer MI)

A. Purification of Trioxane

The trioxane used was distilled at 114° C. from sodium metal to remove water with benzophenone as indicator, under the protection of dry nitrogen. Two hundred grams of trioxane (Aldrich Co.) was placed in a 500 ml round bottom flask equipped with a magnetic stirrer. The system was heated to about 80° C., then 0.5 gram of sodium metal and 0.3 gram of benzophenone was added under stirring. When water was removed by sodium, the color of solution changed from light yellow to brown, then to blue. After the appearance of the blue color, the temperature was raised to about 114° C. for distillation. Early portions of the distillate were discarded. The collected later portions had a water content of about 40–70 ppm.

B. Bulk Copolymerization

In the case of bulk copolymerization, 2.5 grams of EHMDO were injected into a 25mm×75mm test tube through a serum stopper capped on the test tube. The test tube contained 22.5 grams of trioxane and was equipped with a magnetic stirrer. The test tube was then placed in an oil bath. When the temperature reached 65° C., 3μl of BF₃·Et₂O was injected. Within several seconds to several minutes (depending on the water content of the reaction mixture), the solution became immobilized by the growth of polymer throughout the test tube. The copolymerization was allowed to proceed at 60° C. to 65° C. for 20–24 hours.

C. Solution Copolymerization

In the case of solution copolymerization, 18 grams of trioxane and 2 grams of EHMDO were placed in a 100 ml round bottom flask equipped with a magnetic stirrer and containing 20 ml of cyclohexane. When the temperature reached 65° C., 20 μl of BF₃·Et₂O was injected through the serum stopper every two minutes until copolymerization occurred and a white precipitate appeared. The total amount of initiator was about 60–100 μl for a feed ratio of trioxane to EHMDO of 18:2. The copolymerization was then carried out at 65° C. for four hours.

Example III

(Hydrolysis of Copolymer)

The crude copolymers obtained in Example II above were ground into small particles, then washed with 1% triethanolamine (TEOA) and methanol solution under stirring conditions for 30–40 minutes so as to neutralize the initiator. The copolymer was then filtered, washed with acetone three times, and dried under vacuum at 50° C. The unstable end groups of copolymer and the homopolymer of trioxane formed in the copolymerization can be removed by base hydrolysis in the following manner.

In a 500 ml two-neck round bottom flask fitted with an air cooled, straight through condenser and magnetic stirrer were placed 20 grams of crude copolymer, 100 ml dimethylformaldehyde (DMF), 100 ml of benzyl alcohol and 1% TEOA based on total solution volume. The mixture was stirred and heated at 170°-175° C. to dissolve the copolymer. The contents were maintained at refluxing condition until the visible evolution of formaldehyde ceased. The polymer solution was then cooled to precipitate out the solid material. The solid was removed and washed by acetone three times, then filtered and dried under vauum at room temperature. The yield after hydrolysis was about 30% by weight.

Example IV

Comonomers of trioxane (TOX) and the trimethylolpropane formal (TMP) derivative obtained in Example I.B (i.e., an EHMDO ester of acetic acid, monomer MII) were copolymerized as follows. Table 1 below sets forth the conditions and results of this Example IV. NMR spectra confirmed that the resulting copolymer contained units derived from the trioxane and MII comonomers.

TABLE 1

| Samples No. | Monomers TOX (g) | Monomers MII (g) | BF₃·OEt₂ (μl) | Solvent Cyclohexane (ml) | Reaction Condition °C./hr | Yield (%) Before* hydro. | Yield (%) Base hydro. | Feed Mole %, MII | Copolymer Total | Copolymer Forms of MII Incorporated, Mole %+ Ester Group Survive % | Copolymer Forms of MII Incorporated, Mole %+ Chain Transfer End Group % | Copolymer Forms of MII Incorporated, Mole %+ Other % |
|---|---|---|---|---|---|---|---|---|---|---|---|---|
| 1-1 | 10.3 | 1.0 | 10 + 10 | 15 | 65/4 | 96.5 | 61.2 | 4.42 | 3.60 | 12.5 | 25.7 | 61.2 |
| 1-2 | 17.0 | 3.0 | 20 + 20 | 20 | 65/4 | 91.7 | 57.8 | 7.79 | 9.23 | 44.9 | 13.9 | 31.2 |
| 1-3 | 16.0 | 4.0 | 25 | (Bulk) | 65/24 | 93 | 45.0 | 10.69 | 6.99 | 42.0 | 45.0 | 13.0 |
| 1-4 | 22.7 | 1.21 | 3 | (Bulk) | 65/40 | 70 | 65.4 | 2.52 | 1.71 | 21.5 | 43.6 | 34.9 |

*After suspended in 1% TEOA in methanol for one hour.
+Based on ¹H-NMR

Example V

Trioxane and a trimethylolpropane formal (TMP) derivative obtained in Example I.C above (i.e., an EHMDO ester of acrylic acid, monomer MIII) were copolymerized in the manner set forth in Example II above. NMR spectra confirmed that the resulting copolymer contained units derived from both the trioxane and the EHMDO ester comonomers. The following Table 2 show the mol % incorporation in the polymer chain of units derived from monomer MIII versus the mol% feed of monomer MIII:

TABLE 2

| MIII Feed (mole %) | Mole % of MIII in Copolymer (Based on CH3) | Mole % of MIII in Copolymer (Based on CH=CH2) |
|---|---|---|
| 4.76 | 1.93 | 0.86 |
| 2.31 | 1.41 | 0.80 |

Trioxane and a trimethylolpropane formal (TMP) derivative obtained in Example I.D above (i.e., an EHMDO ester of 3-chloro-propanoic acid, monomer MIV) were copolymerized in the manner set forth in Example II above. NMR spectra confirmed that the resulting copolymer contained units derived from both the trioxane and monomer MIV, with about 3 mol % incorporation of units derived from monomer MIV in the polymer chain for a monomer MIV feed of 3.6 mol%.

Example VII

Trioxane and a trimethylolpropane formal (TMP) derivative obtained in Example I.E above (i.e., an EHMDO ester of 2-methylacrylic acid, monomer V) were copolymerized in the manner set forth in Example II above. NMR spectra confirmed that the resulting copolymer contained units derived from both the trioxane and monomer MV, with about 1.4 mole % incorporation of units derived from monomer MV in the polymer chain for a monomer MV feed of 2.1 mol%.

Example VIII

Trioxane and a trimethylolpropane formal (TMP) derivative obtained in Example I.F above (i.e., an EHMDO ester of 3-methylacrylic acid, monomer VI) were copolymerized in the manner set forth in Example II above. NMR spectra confirmed that the resulting copolymer contained units derived from both the trioxane and monomer MVI, with about 0.55 mole % incorporation of units derived from monomer MVI in the polymer chain for a monomer MVI feed of 2.1 mol%.

Example IX

Trioxane and a trimethylolpropane formal (TMP) derivative obtained in Example I.G above (i.e., an EHMDO ester of undedocenoic acid, monomer MVII) were copolymerized in the manner set forth in Example II above. NMR spectra confirmed that the resulting copolymer contained units derived from both the trioxane and monomer MVII, with about 4.1 mole % incorporation of units derived from monomer MVII in the polymer chain for a monomer MVII feed of 5.4 mol%.

Example X

Trioxane and a trimethylolpropane formal (TMP) derivative obtained in Example I.H above (i.e., an EHMDO ester of cinnamic acid, monomer MVIII) were copolymerized in the manner set forth in Example II above. NMR spectra confirmed that the resulting copolymer contained units derived from both the trioxane and monomer MVIII, with about 1.2 mole % incorporation of units derived from monomer MVIII in the polymer chain for a monomer MVIII feed of 6.1 mol%.

Example XI

Trioxane and a trimethylolpropane formal (TMP) derivative obtained in Example I.I above (i.e., an EHMDO ester of 3,3-dimethylacrylic acid, monomer MIX) were copolymerized in the manner set forth in Example II above. NMR spectra confirmed that the resulting copolymer contained units derived from both the trioxane and monomer MIX, with about 4.2 mole % incorporation of units derived from monomer MIX in the polymer chain for a monomer MIX feed of 6.1 mol%. The amount of double bonds surviving was found to be about 0.9 mole%.

Example XII

Trioxane and trimethylolpropane formal acetate (TMPFA) were copolymerized according to the conditions identified in Tables 3 and 4 below. 45 cc of trioxane and TMPFA in the amounts identified in Table 3 were added to an appropriate reaction vessel heated to about 80° C. Thereafter BF₃·Et₂O as initiator was added and the time between initiator addition and the appearance of an exotherm (e.g., an increase in the reaction mixture temperature of at least about 5° C.) was recorded as the induction time. The reaction was allowed to continue for at least 20 minutes and thereafter allowed to cool to room temperature for about 40 minutes. The resulting copolymer was recovered and broken into small particles. The particles were then soaked in 0.5 wt% triethylamine (TEA) solution so as to neutralized any unreacted initiator. The copolymer was then subjected to hydrolysis by adding, in an autoclave, 25.0 grams of the crude copolymer to a TEA solution comprised of 1% TEA, 34% methanol and 65% water. The copolymer and TEA solution was heated to between 180° C. to 190° C. under pressure and maintained at that temperature for about 30 minutes. After cooling, the hydrolyzed copolymer was washed, filtered and dried in a recrystallizing dish.

TABLE 3

| SAMPLE NO. | COMONOMER FEED | | | TRIOXANE FEED | | | INITIATOR FEED (BF₃ PPM) | TOTAL CHARGE (g) |
|---|---|---|---|---|---|---|---|---|
| | Vol. (cc) | Wt. % | Mole % | Vol. (cc) | Wt. % | Mole | | |
| 3-1 | 1.80 | 3.59 | 0.59 | 45.0 | 96.41 | 99.41 | 51 | 54.61 |
| 3-2 | 1.80 | 3.59 | 0.59 | 45.0 | 96.41 | 99.41 | 101 | 54.61 |
| 3-3 | 3.60 | 6.94 | 1.17 | 45.0 | 93.06 | 98.83 | 49 | 56.57 |
| 3-4 | 1.80 | 3.59 | 0.59 | 45.0 | 96.41 | 99.41 | 51 | 54.61 |
| 3-5 | 1.80 | 3.59 | 0.59 | 45.0 | 96.41 | 99.41 | 51 | 54.61 |
| 3-6 | 1.80 | 3.59 | 0.59 | 45.0 | 96.41 | 99.41 | 101 | 54.61 |
| 3-7 | 3.60 | 6.94 | 1.17 | 45.0 | 93.06 | 98.83 | 98 | 56.57 |
| 3-8 | 3.60 | 6.94 | 1.17 | 45.0 | 93.06 | 98.83 | 977 | 56.57 |
| 3-9* | 1.80 | 3.56 | 0.59 | 45.0 | 95.48 | 99.01 | 100 | 55.14 |
| 3-10* | 1.80 | 3.58 | 0.59 | 45.0 | 95.48 | 99.01 | 50 | 55.14 |
| 3-11 | 1.80 | 3.59 | 0.59 | 45.0 | 96.41 | 99.41 | 1013 | 54.61 |
| 3-12 | 1.80 | 3.59 | 0.59 | 45.0 | 96.41 | 99.41 | 101 | 54.61 |
| 3-13 | 3.60 | 6.94 | 1.17 | 45.0 | 93.06 | 98.83 | 98 | 56.57 |
| 3-14 | 1.80 | 3.59 | 0.59 | 45.0 | 96.41 | 99.41 | 101 | 54.61 |
| 3-15 | 1.80 | 3.59 | 0.59 | 45.0 | 96.41 | 99.41 | 101 | 54.61 |

*Also containing dioxolane in the amount of 0.96 wt. %/0.4 mole %/0.50 cc

TABLE 4

| SAMPLE NO. | REACTION TIME (MIN.) | % OVERALL YIELD | MOLECULAR WEIGHT (Approx.) |
|---|---|---|---|
| 3-1 | 60-120 | 35.70 | ND* |
| 3-2 | 60-120 | 20.50 | " |
| 3-3 | 60-120 | 50.25 | " |
| 3-4 | 12 | 21.33 | " |
| 3-5 | 20 | 16.94 | 41,800 |
| 3-6 | 20 | 16.66 | 47,600 |
| 3-7 | 20 | 19.70 | 48,100 |
| 3-8 | 20 | 10.91 | 42,200 |
| 3-9 | 20 | 42.31 | 59,400 |
| 3-10 | 20 | 34.37 | 53,200 |
| 3-11 | 20 | 4.87 | 37,400 |
| 3-12 | 120 | 8.18 | 36,750 |
| 3-13 | 120 | 8.02 | 36,100 |
| 3-14 | 20 | 1.60 | 33,200 |
| 3-15 | 20 | 4.11 | 34,450 |

*Not Determined

As is evident from the Examples above, the present invention achieves novel acetal copolymers via the cationic copolymerization of trioxane and trimethylolpropane formal or its ester derivatives. The acetal copolymers will, moreover, have pendant functional groups derived from the TMP formal or the ester derivatives of TMP formal—that is, hydroxyl or ester moieties which survive the copolymerization process. These functional moieties will therefore provide a reactive site for the subsequent synthesis of block copolymers and/or to chemically bind modifiers to the acetal copolymer backbone, for example.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. As essentially linear acetal copolymer of the formula:

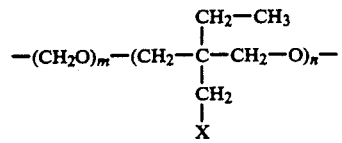

where X is an ester radical or a hydroxyl radical obtained by hydrolyzing an ester radical, and m and n are each integers such that m+n is between 5 to 20000, and the mole ratio of units of subscript n to the units of subscript m is between about 1:5000 to 1:1, and wherein said acetal copolymer is the reaction product of trioxane and an ester derivative of trimethylolpropane formal.

2. An essentially linear acetal copolymer comprised of the reaction product of trioxane and an ester derivative of trimethylolpropane formal, said copolymer having a ratio of units derived from said ester derivative of trimethylolpropane formal to units derived from trioxane of between 1:5000 1:1, and having a molecular weight of up to about 500,000, thermal stability in excess of 200° C., and greater than about 40% crystallinity.

3. An acetal copolymer as in claim 2, wherein said trimethylolpropane formal or its ester derivatives is of the formula:

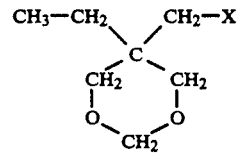

where X is an ester radical.

4. An acetal copolymer as in claim 3, wherein X is represented by the formulas;

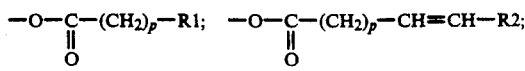

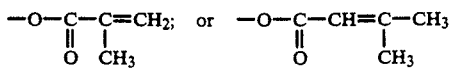

where each p is an integer from zero to 8, R1 is a methyl or phenyl radical, and R2 is hydrogen or a methyl or phenyl radical.

5. An acetal copolymer as in claim 4, wherein X is a halogen substituted ester.

6. An acetal copolymer as in claim 5, wherein said halogen substituted ester is a halogen substituted alkanoic acid.

7. An acetal polymer as in claim 6, wherein said halogen substituted ester is 2-chloro-ethanoic acid or 3-chloro-propanoic acid.

8. A method of making as essentially linear acetal copolymer comprising polymerizing, under acetal copolymer polymerization conditions, trioxane and an ester derivative of trimethylolpropane formal.

9. A method as in claim 8, further comprising polymerizing trioxane, an ester derivative of trimethylolpropane formal, and at least one additional comonomer selected from the group consisting of cyclic ethers.

10. A method as in claim 9, wherein said additional comonomer is at least one selected from the group consisting of ethylene oxide, 1,3-dioxolane, 1,3-dioxepane, 1,3-dioxep-5-ene, and 1,3,5-trioxepane.

11. A method of making an essentially linear acetal copolymer of the formula:

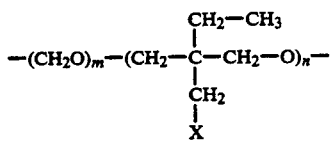

where X is an ester radical, and m and n are each integers such that m+n is between 5 to 20000, and the mole ratio of units of subscript n to the units of subscript m is between about 1:5000 to 1:1, which method comprises cationically copolymerizing trioxane and an ester derivative of trimethylolpropane formal of the formula:

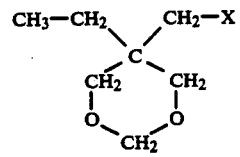

where X is an ester radical.

12. A method as in claim 11, wherein X is represented by the formulas;

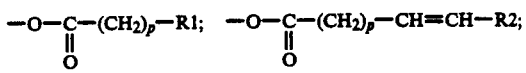

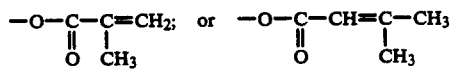

where each p is an integer from zero to 8, R1 is a methyl or phenyl radical, and R2 is hydrogen or a methyl or phenyl radical.

13. A method as in claim 11, wherein said copolymerization is initiated with boron trifluoride.

14. A method as in claim 11, wherein said copolymerization is initiated with a coordination complex of boron fluoride.

15. A method as in claim 14, wherein said coordination complex of boron fluoride is boron trifluoride etherate.

16. A method as in claim 8, further comprising subjecting the acetal copolymer to hydrolysis conditions sufficient to hydrolyze the pendent ester groups thereof derived from said ester derivative of trimethylolpropane to obtain pendant hydroxyl groups.

17. A method as in claim 11 or 12, further comprising subjecting the acetal copolymer to hydrolysis conditions sufficient to hydrolyze the pendant ester groups thereof derived from said ester derivative of trimethylolpropane to obtain pendant hydroxyl groups.

* * * * *

UNITED STATES PATENT AND TRADEMARK OFFICE
CERTIFICATE OF CORRECTION

PATENT NO. : 5,004,798

DATED : April 2, 1991

INVENTOR(S) : BROUSSARD et al

It is certified that error appears in the above-identified patent and that said Letters Patent is hereby corrected as shown below:

Column 2, line 46, change "$(-CH_2O)$" to --$(-CH_2O-)$--.

Column 3, line 16, change "by" to --be--.

Column 4, line 9, change "from" to --form--.

Signed and Sealed this

Fifth Day of January, 1993

*Attest:*

DOUGLAS B. COMER

*Attesting Officer*    *Acting Commissioner of Patents and Trademarks*